(12) United States Patent
Loudet

(10) Patent No.: US 7,264,441 B2
(45) Date of Patent: Sep. 4, 2007

(54) HYBRID CYCLE HIGH PRESSURE COMPRESSOR AND TURBINE ENGINE INCLUDING SUCH A COMPRESSOR

(75) Inventor: Claude Loudet, Maincy (FR)

(73) Assignee: SNECMA Moteurs, Paris (FR)

( * ) Notice: Subject to any disclaimer, the term of this patent is extended or adjusted under 35 U.S.C. 154(b) by 207 days.

(21) Appl. No.: 11/107,837

(22) Filed: Apr. 18, 2005

(65) Prior Publication Data

US 2005/0244269 A1 Nov. 3, 2005

Related U.S. Application Data

(63) Continuation of application No. 10/895,071, filed on Jul. 21, 2004, now abandoned.

(30) Foreign Application Priority Data

Jul. 21, 2003 (FR) .................................. 03 50355

(51) Int. Cl.
*F01D 9/00* (2006.01)
(52) U.S. Cl. .................... 415/144; 415/162; 415/199.5
(58) Field of Classification Search ................ 415/162, 415/144, 199.5
See application file for complete search history.

(56) References Cited

U.S. PATENT DOCUMENTS

| 4,279,568 A | * | 7/1981 | Munroe ....................... 415/17 |
| 4,558,987 A | * | 12/1985 | Dittie .......................... 415/162 |
| 4,874,287 A | | 10/1989 | Grieb |
| 5,155,993 A | * | 10/1992 | Baughman et al. ........ 60/226.1 |
| 5,911,679 A | | 6/1999 | Farrell et al. |
| 6,438,941 B1 | | 8/2002 | Elliott et al. |

* cited by examiner

*Primary Examiner*—Ninh H. Nguyen
(74) *Attorney, Agent, or Firm*—Oblon, Spivak, McClelland, Maier & Neustadt, P.C.

(57) ABSTRACT

The invention relates to a hybrid cycle HP compressor (104) for a turbine engine, comprising in particular a first rotor wheel (16), a first rectifier (118) and a second rotor wheel (20), as well as a separation slot (22) fitted between the first rectifier and the second rotor wheel in order to supply the turbine engine with a secondary air flux. According to the invention, the first rectifier is a double grid rectifier comprising a grid of vanes upstream (30) as well as a grid of vanes downstream (34), these upstream and downstream vane grids being associated respectively with variable setting systems upstream and downstream (38,40) controlled in autonomous manner.

10 Claims, 4 Drawing Sheets

HYBRID CYCLE HIGH PRESSURE COMPRESSOR AND TURBINE ENGINE INCLUDING SUCH A COMPRESSOR

TECHNICAL FIELD

The present invention relates in general to a hybrid cycle turbine engine, and more particularly to a hybrid cycle high pressure compressor equipping such a turbine. In other terms, the invention concerns a turbine engine whose part relating to the high pressure compressor is equipped with a discharge allowing communication between the primary flux of this same compressor, and the secondary flux from the low pressure compressor.

STATE OF PRIOR ART

A classic hybrid cycle turbine engine according to prior art is partially shown in FIG. 1, in longitudinal cross-section.

This turbine engine 1 comprises, from upstream to downstream, in a principal flow direction of gases shown diagrammatically by the arrow Eg, a low pressure compressor 2, as well as a hybrid cycle high pressure compressor 4. As can be seen in FIG. 1, the two compressors 2 and 4 are closely annular in shape, and centred on a longitudinal principal axis 6 of the turbine engine 1. Evidently, this axis 6 also acts as longitudinal principal axis for these two compressors 2 and 4.

As known in prior art, the low pressure compressor 2 and the hybrid cycle high pressure compressor, called "hybrid cycle HP compressor" in the following description, are coupled respectively to low pressure turbines and high pressure turbines (not shown), through the intermediary of axes 8 and 10.

The particularity of this turbine engine 1 lies in the fact that the compressor HP 4 has a hybrid cycle, meaning that it has a configuration such that it can feed air both to a combustion chamber 12 to ensure propulsion of the turbine engine 1, and also a secondary flux contributing to the overall establishment of a classic cycle of a double flux, double body, turbine engine, as will be described in detail below.

In fact, as can be seen in FIG. 1, the hybrid cycle HP compressor 4 comprises from upstream to downstream, along the principal gas flow direction Eg, an inlet guide vane (IGV) 14, a first rotor wheel 16, a first rectifier with a grid of vanes 18, a second rotor wheel 20, as well as a plurality of other rotor wheels and rectifiers (not referenced) arranged in alternate fashion, as far as a downstream end of the HP compressor 4 fitted close to the combustion chamber 12.

Between the first rectifier 18 and the second rotor wheel 20, in a hybrid cycle configuration a separation slot 22 is provided extending radially outwards and downstream, starting from an external wall of this HP compressor 4. Preferably the separation slot 22 takes the shape of an annular duct opening on the one hand into the interior of the HP compressor 4 downstream of the first rectifier 18 and upstream of the second rotor wheel 20, and on the other hand in an annular seam 24 through which a secondary air flux circulates, represented diagrammatically by the arrow Fs.

In this way, as mentioned above, part of the air constituting the secondary flux Fs can be bled inside the HP compressor 4, such that this secondary flux Fs is significantly reinforced. Furthermore, with the aid of a carefully positioned guide vane 25, for example at the exit from the separation slot 22, it is possible to vary the by-pass ratio, that is the ratio between the quantity of air of the secondary flux from the HP compressor 4 and the total quantity of air from this same secondary flux. Concerning this, it is indicated that hybrid cycle turbine engines are generally designed such that the by-pass ratio can vary between about 0 and 20%, the effective variation range of this by-pass ratio being, in fact, more or less extensive depending on the applied speed.

This specificity of hybrid cycle turbine engines is globally advantageous, in the sense that it allows a variable by-pass ratio to be obtained for a constant motor nozzle position, which then makes it possible to raise certain performances of this motor.

Nonetheless its special architecture, and more specifically that of its HP compressor 4, introduce major disadvantages.

In fact, it is shown that for dealing with the speed variations of the turbine engine 1, the first rectifier 18 takes the shape of a grid of vanes with variable settings, identical to that found in traditional HP compressors for non-hybrid cycle turbine engines.

Thus, even if the variable setting technology applied to the HP compressor makes it possible to respond correctly to speed variations of the turbine engine, it is still not satisfactory when it comes to taking into account the variations of a supplementary aerodynamic parameter, that is the air bleed from the separation slot.

In fact, it has been noted that the fact of envisaging a variable by-pass ratio for any given speed would also produce very variable aerodynamic conditions for the vanes of the first and second rotor wheels of the HP compressor, such that the overall performances of this HP compressor would be greatly diminished.

As an example; it is noted that the surge margin capacities are significantly attenuated due to this variability in aerodynamic conditions, these capacities nonetheless being necessary for all compressors and under all operating conditions.

DESCRIPTION OF THE INVENTION

The aim of the invention is therefore to propose a hybrid cycle HP compressor whose design remedies, at least partially, the disadvantages described above in relation to productions according to prior art.

Moreover, the aim of the present invention is to present a hybrid cycle turbine engine comprising such a hybrid cycle HP compressor.

In order to do this, the first aim of the invention is a hybrid cycle HP compressor for a turbine engine, the compressor comprising a plurality of rotor wheels and rectifiers arranged alternately, with successively from upstream to downstream in a principal direction of air flow through the compressor, a first rotor wheel, a first rectifier and a second rotor wheel, the compressor furthermore comprising a separation slot set between the first rectifier and the second rotor wheel in order to feed the turbine engine with a secondary air flux. According to the invention, the first rectifier is a double grid rectifier comprising a grid of vanes upstream as well as a grid of vanes downstream, and in that these vane grids upstream and downstream are associated respectively with variable setting systems upstream and downstream controlled in autonomous manner.

Advantageously, the special fitting proposed makes it possible to optimise, independently and in function of the speed of the turbine engine and the by-pass ratio required, on the one hand adaptation of the angle of incidence of this first rectifier by action on the upstream grid of vanes, and on the other hand the regulation of the pre-rotation of the second rotor wheel by action on the downstream grid of vanes. The independence of the variable setting systems upstream and downstream consequently makes it possible to significantly optimise the aerodynamic character of the first rectifier, as well as the pre-rotation of the second rotor wheel acting on the whole HP compressor unit downstream.

In this way, as an indicative example, when the by-pass ratio required is low, action aimed at opening the downstream grid of vanes of the first rectifier makes it possible to give the second rotor wheel the capability of absorbing a greater quantity of air flow, while independent action on the upstream grid of vanes makes it possible to conserve optimised co-operation between the first rotor wheel and this same upstream grid of vanes.

Evidently, this form of operation could not be envisaged in hybrid cycle turbine engines of prior art, because of the existing opposition between the needs for closing the single inlet grid of vanes, and the needs for opening this same single grid as outlet.

In other terms, the invention is particularly advantageous in the sense that the appearance of a supplementary aerodynamic parameter in hybrid cycle HP compressors, that is that of variable air bleed by means of a separation slot, is supported by the addition of an extra degree of freedom of adaptation, since the single grid proposed previously is replaced by a double grid with variable and independent settings.

Consequently, the fact of having a double grid whose upstream grid has the principal function of optimising its co-operation with the first rotor wheel, and whose downstream grid has the principal function of dealing with the variability of the by-pass ratio, means that the adaptation capability of the hybrid cycle HP compressor is therefore greater than that found in prior art.

Finally, it is indicated that the possibility of envisaging two setting rules, independent and defined in function of both the speed and the by-pass ratio, produces great improvement in the overall aerodynamic performance of the HP compressor, at whatever points of the cycle and above all concerning the surge margin capacities, independent of the applied by-pass ratio.

Preferably, each vane of each of the upstream and downstream grids is able to be pivoted around an axis of rotation extending closely radially. Therefore, it is thus possible to envisage that for each vane of the upstream grid, the axis of rotation is located close to a trailing edge of this vane, and that for each vane of the downstream grid, the axis of rotation is located close to a leading edge of this vane.

Advantageously, the specific positioning of the axes of rotation makes it possible to optimise the aerodynamic effect of the slit present between the upstream vane and the downstream vane of each vane couple of the first rectifier.

More precisely, the design of the compressor can be such that for each vane of the upstream grid, the axis of rotation is located in a downstream portion of the latter beginning at the level of two thirds of a chord of this vane, and for each vane of the downstream grid, the axis of rotation is located in an upstream portion of the latter finishing at the level of a third of a chord of this vane.

Preferably, in transversal cross-section taken along any plane located upstream of the first rectifier, on any circle centred on a principal longitudinal axis of the compressor and intercepting the upstream and downstream grids of vanes, a length L1 of an arc of a circle defined by the axis of rotation of any vane of the upstream grid as well as by the axis of rotation of the vane of the downstream grid the closest to any vane of the upstream grid, and a length L2 of an arc of a circle defined by the axes of rotation of two consecutive vanes of the upstream grid, are such that L1 is less than or equal to a third of L2.

Advantageously, this specificity makes it possible to optimise even further the aerodynamic effect of the slit present between the upstream vane and the downstream vane of each vane couple of the first rectifier, whatever the settings adopted for the upstream and downstream grids.

Finally, a further aim of the invention is also a hybrid cycle turbine engine comprising a hybrid cycle HP compressor such as that described hereabove and also subject of the present invention.

Other advantages and characteristics of the invention will become clear in the detailed but non-limiting description given below.

BRIEF DESCRIPTION OF THE DRAWINGS

This description refers to the attached drawings among which.

DETAILED DESCRIPTION OF A PREFERRED EMBODIMENT

Figure 2:
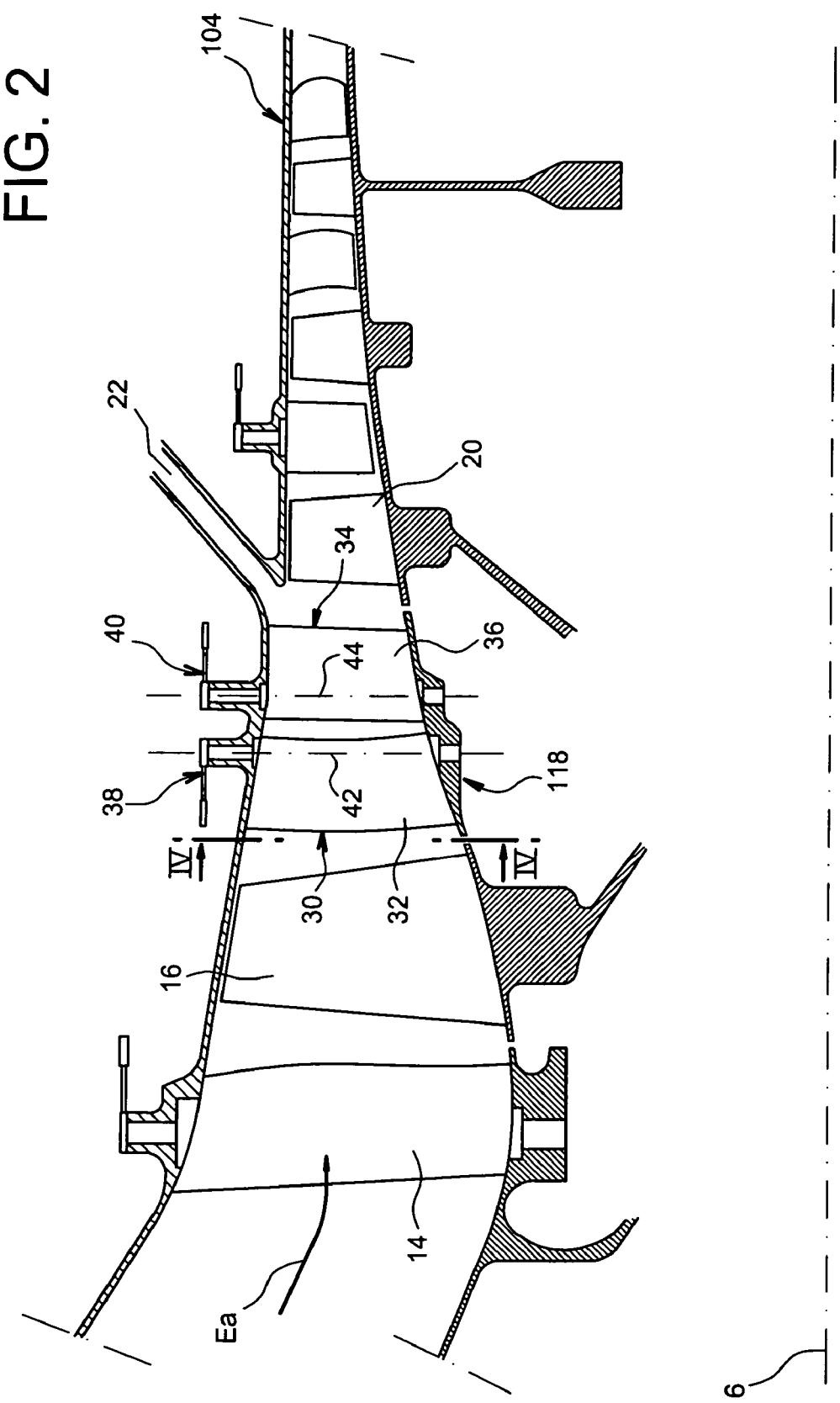
FIG. 2 shows a longitudinal half section of a hybrid cycle HP compressor according to a preferred embodiment of the present invention.

With reference to FIG. 2, a hybrid cycle HP compressor 104 is shown, according to a preferred embodiment of the present invention.

This hybrid cycle HP compressor 104 is intended to equip a hybrid cycle turbine engine, also the aim of the present invention.

Figure 1:
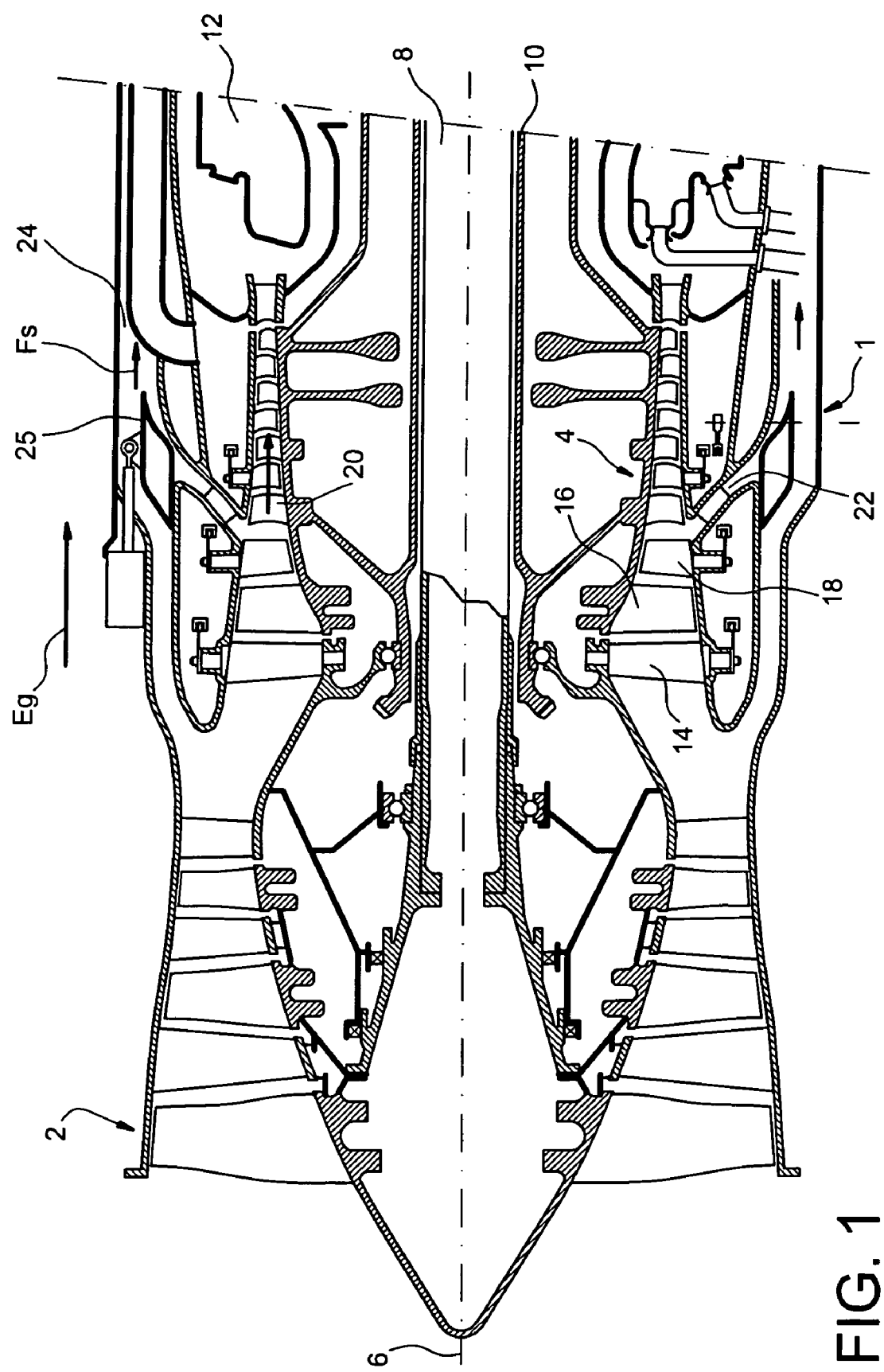
FIG. 1, already described, represents a hybrid cycle turbine engine of prior art.

As an illustrative example, the hybrid cycle turbine engine according to the invention can be closely identical to that described previously and shown in FIG. 1. In such a case, the single difference between the turbine engine according to the invention and the turbine engine 1 then rests in the fact that the hybrid cycle HP compressor 4 of the turbine engine 1 is replaced by the hybrid cycle HP 104 described below.

As can be seen in FIG. 2, the hybrid cycle HP compressor 104 is closely identical to the hybrid cycle HP compressor 4 of the turbine engine 1, the principal difference being at the level of the first rectifier. Concerning this, it is indicated that in FIGS. 1 to 4, the elements carrying the same reference numbers correspond to identical or similar elements.

Consequently, it can be seen that the hybrid cycle HP compressor 104 extends in an annular manner around a principal longitudinal axis 6, corresponding also to the principal longitudinal axis of the turbine engine on which it is installed.

In addition, this HP compressor 104 comprises, from upstream to downstream and in a principal air flow direction through this same compressor represented by the arrow Ea, an inlet guide vane 14, a first rotor wheel 16, a first vane grid rectifier 118, a second rotor wheel 20, as well as a plurality of other rotor wheels and rectifiers (not referenced) arranged alternately, as far as a downstream end of the HP compressor 104.

Still in the same way as before, between the first rectifier 118 and the second rotor wheel 20, a separation slot 22 is provided extending radially outwards and downstream, from an external wall of this HP compressor 104. Preferably, the separation slot 22 has the shape of an annular duct opening on the one hand into the interior of the HP compressor 104 downstream of the first rectifier 118 and upstream of the second rotor wheel 20, and on the other hand in an annular seam (not shown in FIG. 2) through which a flux of secondary air circulates.

Thus, part of the air constituting the secondary flux can be bled inside the HP compressor 104, such that this secondary flux is significantly reinforced.

The particularity of the HP compressor 104 according to the invention rests in the fact that the first rectifier 118 takes the form of a double grid rectifier. In fact, this first rectifier 118, located between the first and second rotor wheels 16 and 20, is constituted of an upstream grid 30 provided with a plurality of upstream vanes 32 spaced out regularly in annular fashion, together with a downstream grid 34 provided with a plurality of downstream vanes 36 also spaced out regularly in annular fashion. Preferably, each of the grids 30 and 34 comprises an identical number of vanes 32 and 36. Consequently, these grids 30 and 34 have the same pitch.

Still referring to FIG. 2, it can be seen that the upstream grid of vanes 30 is associated with a variable upstream setting system 38. In analogous fashion, the downstream grid of vanes 34 is associated with a variable downstream setting system 40. Furthermore, it is indicated that the two control rules piloting respectively the variable setting systems upstream 38 and downstream 40 are totally independent from each other, and that both of them are planned in such a way as to take into account both the speed of the turbine engine and the applied by-pass ratio.

Thus, this special layout makes it possible to enhance the aerodynamic capacities of the HP compressor 104 to withstand the variability of the air bleed carried out through the intermediary of the separation slot 22.

As an example, the hybrid cycle HP compressor 104 could be designed such that the difference in angle between the two settings is a direct function of the applied by-pass ratio.

Figure 3:
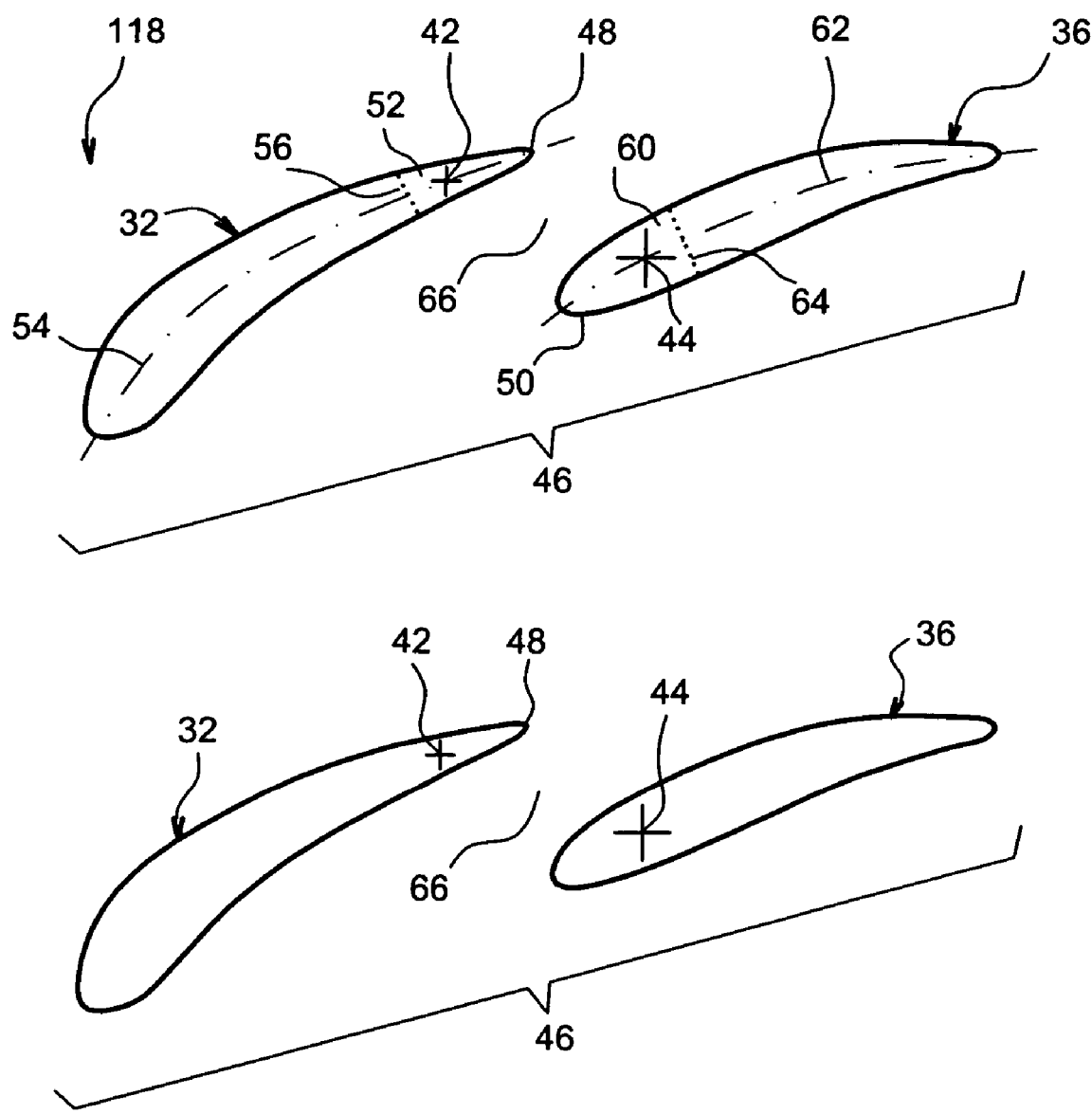
FIG. 3 shows a partial view from above of the hybrid cycle HP compressor of FIG. 2.

With reference now to both FIGS. 2 and 3, it can be seen that each vane 32 of the upstream grid 30 is able to be pivoted around an axis of rotation 42, each of the axes of rotation 42 extending closely radially. In the same way, each vane 36 of the downstream grid 34 is able to be pivoted around an axis of rotation 44, each of the axes of rotation 44 extending closely radially. Evidently, in a way known to those skilled in the art, it is this possibility of making each of the vanes 32 and 36 of a same grid 30 and 34 pivot at the same time, which enables "variable setting" of these grids 30 and 34.

Moreover, as can be clearly seen in FIG. 3, the grids of vanes upstream 30 and downstream 34 are fitted such that each upstream vane 32 is closely prolonged downstream by a downstream vane 36, so that these two vanes 32 and 36, located close to each other, form a vane couple 46.

This then makes it possible to roughly assimilate each vane couple 46 to a "single vane with variable curvature", in that each of the two vanes 32 and 36, constituting a vane couple 46, can be set in independent fashion.

In order to accentuate even further this notion of "single vane with variable curvature", it is advantageous to envisage that for each upstream vane 32 of the upstream grid 30, the axis of rotation 42 is located close to a trailing edge 48 of this vane 32. In the same way, for each downstream vane 36 of the downstream grid 34, the axis of rotation 44 is located close to a leading edge 50 of this vane 36.

More specifically, and still with reference to FIG. 3, it can be envisaged that for each upstream vane 32 of the upstream grid 30, the axis of rotation 42 is located in a downstream portion 52 of the latter, the downstream portion 52 beginning, preferably, at the level of two thirds of a chord 54 of the vane 32, evidently on the side of the trailing edge 48. It is noted that this demarcation is shown diagrammatically by the dotted line 56. In analogous manner, for each downstream vane 36 of the downstream grid 34, the axis of rotation 44 is located in an upstream portion 60 of the latter, the upstream portion 60 preferably ending at the level of a third of a chord 62 of the vane 36, on the side of the leading edge 50. Here again, this demarcation is shown diagrammatically by the dotted line 64.

Consequently, it can be seen that the specific positioning of these axes of rotation 42 and 44 makes it possible to optimise the aerodynamic effect of a slit 66 located between the upstream vane 32 and the downstream vane 36 for each vane couple 46 of the first rectifier 118, whatsoever the settings of the upstream grids 30 and downstream grids 34 controlled respectively by variable setting systems 38 and 40.

Figure 4:
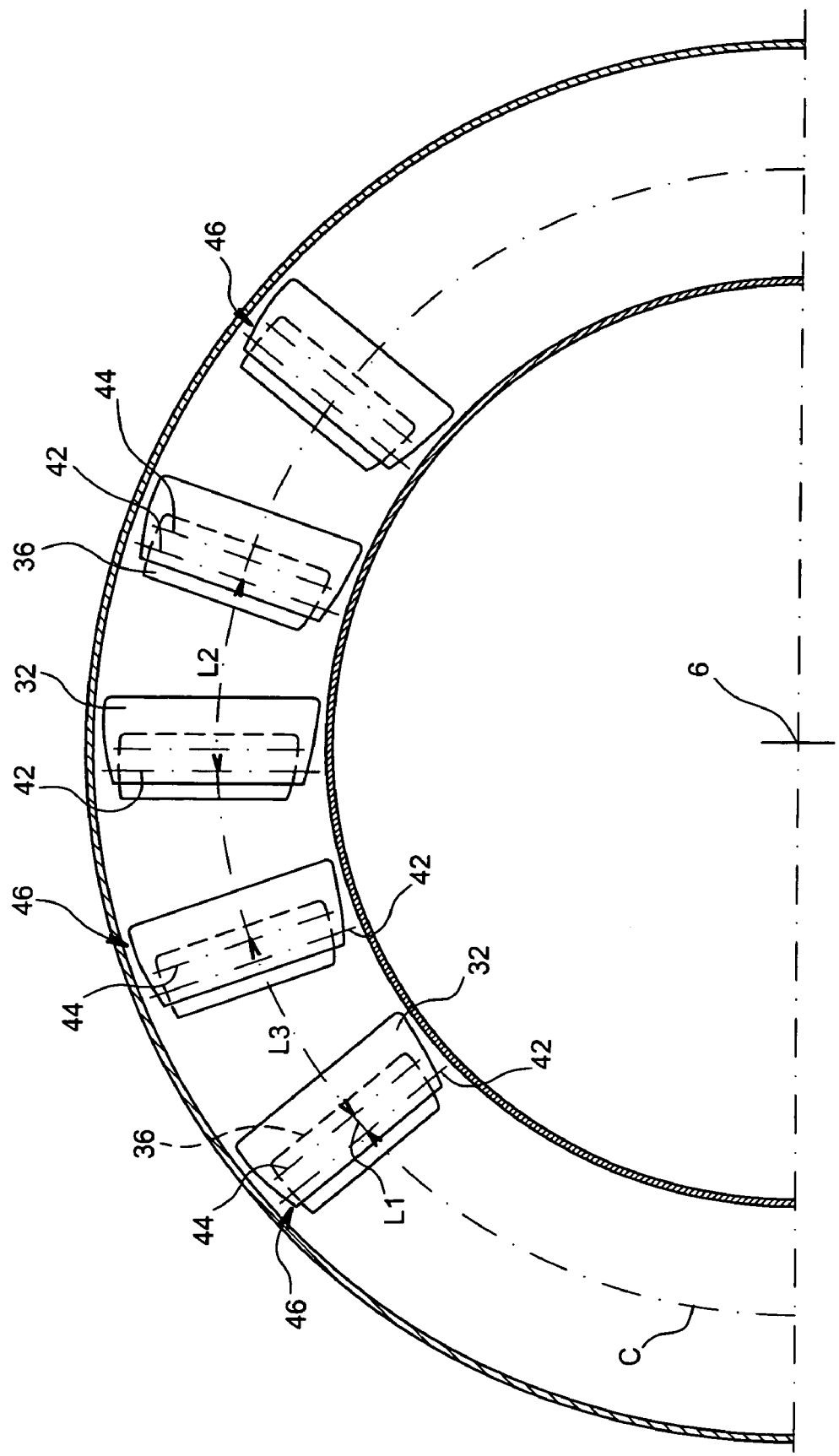
FIG. 4 shows a partial and diagrammatic view in cross-section along the line IV-IV of FIG. 2.

Furthermore, the proximity of the upstream vanes 32 and downstream vanes 36 of each vane couple 46, enabling the aerodynamic properties of the first rectifier 118 to be optimised significantly, can be seen in particular in FIG. 4, showing diagrammatically and partially a transversal cross-section taken along a plane upstream of the upstream vane grid 30. For information, the plane concerned is indicated diagrammatically by the line IV-IV of FIG. 2.

In fact, in this FIG. 4, any circle C is represented centred on the principal longitudinal axis 6 of the HP compressor 104, this circle intercepting each of the grids of vanes upstream 30 and downstream 34.

On this circle C, first of all a length L1 of an arc of a circle is shown, defined on the one hand by the axis of rotation 42 of any vane 32 of the upstream grid 30, and on the other hand by the axis of rotation 44 of the closest vane 36 of any upstream vane 32. In other terms, for each vane couple 46 of the first rectifier 118, the length L1 is that of the arc of a circle defined by the axes of rotation 42 and 44 of the vanes 32 and 36 constituting the couple 46.

On the other hand, on this same circle C whose size as shown in FIG. 4 is given as an indicative but non-limiting example, a length L2 of an arc of a circle is also shown, defined by the axes of rotation 42 of two consecutive vanes 32 of the upstream grid 30.

Furthermore, on this circle C, a length L3 of an arc of a circle is shown, defined by the axes of rotation 44 of two consecutive vanes 36 of the downstream grid 34. In this case, it is to be noted that the lengths L2 and L3 are preferably identical.

Evidently, the vanes 32 and 36 being spaced regularly around the principal longitudinal axis 6, the lengths L1, L2 and L3 are identical whatsoever the vanes or couples under consideration.

Preferably, it can be envisaged that the first rectifier 118 is designed such that L1 is less than or equal to a third of L2 or L3, which would make it possible to obtain a hybrid cycle HP compressor 104 whose overall aerodynamic performances are very satisfactory, whatsoever the points of the cycle and above all considering the surge margin capacities, independent of the applied by-pass ratio.

Evidently, various modifications can be made by those skilled in the art to the hybrid cycle HP compressor 104, described above uniquely as a non-limiting example.

The invention claimed is:

1. A cycle HP compressor for a turbine engine, said compressor comprising:
    a plurality of rotor wheels and rectifiers arranged alternately, from upstream to downstream successively in a principal direction of air flow through the compressor, a first rotor wheel a first rectifier and a second rotor wheel,
    a separation slot set between the first rectifier and the second rotor wheel in order to supply the turbine engine with a secondary air flux,
    wherein the first rectifier is a double grid rectifier comprising a grid of vanes upstream as well as a grid of vanes downstream,
    wherein said grids of vanes upstream and downstream are associated respectively with variable setting systems upstream and downstream controlled in autonomous manner,
    wherein each vane of each of the upstream and downstream grids of the first rectifier is capable of being pivoted around an axis of rotation extending closely radially, and
    wherein for each vane of the upstream grid, the axis of rotation is located close to a trailing edge of said vane, and for each vane of the downstream grid, the axis of rotation is located close to a leading edge of said vane.

2. A cycle HP compressor according to claim 1, wherein for each vane of the upstream grid, the axis of rotation is located in a downstream portion of the latter beginning at the level of two thirds of a chord of said vane, and wherein for each vane of the downstream grid, the axis of rotation is located in an upstream portion of the latter, ending at the level of a third of a chord of said vane.

3. A cycle HP compressor according to claim 2, wherein in transversal cross-section taken along any plane located upstream of the first rectifier, on any circle C centered on a principal longitudinal axis of the compressor and intercepting the upstream and downstream grids of vanes, a length L1 of an arc of a circle defined by the axis of rotation of any vane of the upstream grid as well as by the axis of rotation of the vane of the downstream grid the closest to any vane of the upstream grid, and a length L2 of an arc of a circle defined by the axes of rotation of two consecutive vanes of the upstream grid, are such that L1 is less than or equal to a third of L2.

4. A cycle HP compressor according to claim 3, wherein a length L3 of an arc of a circle defined by the rotation axes of two consecutive vanes of the downstream grid is equal to the length L2.

5. A cycle turbine engine comprising a hybrid cycle HP compressor according to claim 2.

6. A cycle HP compressor according to claim 1, wherein in transversal cross-section taken along any plane located upstream of the first rectifier, on any circle C centered on a principal longitudinal axis of the compressor and intercepting the upstream and downstream grids of vanes, a length L1 of an arc of a circle defined by the axis of rotation of any vane of the upstream grid as well as by the axis of rotation of the vane of the downstream grid the closest to any vane of the upstream grid, and a length L2 of an arc of a circle defined by the axes of rotation of two consecutive vanes of the upstream grid, are such that L1 is less than or equal to a third of L2.

7. A cycle HP compressor according to claim 6, wherein a length L3 of an arc of a circle defined by the rotation axes of two consecutive vanes of the downstream grid is equal to the length L2.

8. A cycle turbine engine comprising a hybrid cycle HP compressor according to claim 7.

9. A cycle turbine engine comprising a hybrid cycle HP compressor according to claim 6.

10. A cycle turbine engine comprising a hybrid cycle HP compressor according to claim 1.

* * * * *